United States Patent
Perry et al.

(10) Patent No.: US 6,921,043 B2
(45) Date of Patent: Jul. 26, 2005

(54) WINDING MACHINE AND METHOD PROVIDING IMPROVED SHIELDING RELATIVE TO DEBRIS THAT MAY BE ENCOUNTERED IN A WINDING OPERATION

(75) Inventors: Stuart W. Perry, Anderson, IN (US); Roderick D. Fair, Richmond, IN (US)

(73) Assignee: Delphi Technologies, Inc., Troy, MI (US)

( * ) Notice: Subject to any disclaimer, the term of this patent is extended or adjusted under 35 U.S.C. 154(b) by 236 days.

(21) Appl. No.: 10/295,617

(22) Filed: Nov. 14, 2002

(65) Prior Publication Data

US 2004/0094656 A1 May 20, 2004

(51) Int. Cl.[7] .............................................. B65H 81/06
(52) U.S. Cl. ....................... 242/443; 242/444
(58) Field of Search .......................... 242/443, 443.1, 242/444

(56) References Cited

U.S. PATENT DOCUMENTS

| | | | |
|---|---|---|---|
| 3,314,452 A | * | 4/1967 | Cartwright et al. ....... 242/437.2 |
| 6,156,264 A | | 12/2000 | Johnston et al. |
| 6,232,863 B1 | | 5/2001 | Skinner et al. |
| 6,276,348 B1 | | 8/2001 | Skinner et al. |
| 6,401,333 B1 | * | 6/2002 | Suzuki et al. ................. 29/848 |
| 6,422,225 B1 | | 7/2002 | Hamer et al. |

FOREIGN PATENT DOCUMENTS

| | | | | |
|---|---|---|---|---|
| JP | 361251014 A | * | 11/1986 | ................. 242/443 |
| JP | 404346407 A | * | 12/1992 | ................. 242/443 |
| JP | 404348015 A | * | 12/1992 | ................. 242/443 |

* cited by examiner

*Primary Examiner*—Emmanuel Marcelo
(74) *Attorney, Agent, or Firm*—Jimmy L. Funke

(57) ABSTRACT

Winding machine and method for shielding the winding machine relative to debris during a winding operation are provided. The method allows providing at least one winding assembly. The method further allows feeding a respective strand of wire to the winding assembly, wherein the strand of wire is fed into the assembly through the bottom thereof. A shield is provided for the winding assembly. The shield is configured to include a window at the bottom thereof for allowing passage of the strand of wire. The shield further includes lateral and top sections configured to partially enclose the assembly, wherein the lateral section extends sufficiently beneath the assembly so that any debris therein egresses from the assembly through the window and is prevented from being propelled into any adjacent assemblies, thus reducing the occurrence of debris-induced faults.

12 Claims, 2 Drawing Sheets

WINDING MACHINE AND METHOD PROVIDING IMPROVED SHIELDING RELATIVE TO DEBRIS THAT MAY BE ENCOUNTERED IN A WINDING OPERATION

BACKGROUND OF THE INVENTION

The present invention is generally related to winding machines, and, more particularly, to winding machine and techniques that allow for improved shielding relative to debris, such as may be prevalent during a winding operation.

One known technique of winding, as may be performed by an exemplary winding machine 8 seen in FIG. 1, uses a strand of wire 10 that may be pulled by a rotating receiving spool or bobbin 12, with the strand of wire being fed from above the receiving spool. FIG. 1 is collectively made up of the elevational view of machine 8 illustrated in FIG. 1A and the side view illustrated in FIG. 1B. The strand of wire may be routed from a supply spool of wire (not shown) through a tensioning device 14, and down through a feed tube (e.g., wire guide) to be directed to the bobbin 12 to be wound. The wire guide acts to route the wire to a desired position during the winding of bobbin 12 with the tension device designed to provide an appropriate level of resistance to allow the wire to be properly placed and packed.

A major long term warranty issue particularly with the winding of relatively fine wire gauge (e.g., approximately 40 AWG and smaller diameter) is the presence of small pieces of wire or any other debris that may be undesirably introduced during a winding operation into, under, or on any wound device, such as the windings of an ignition coil, as may be used for automotive applications.

One common source of these small pieces of wire occurs due to operational incidents, such as the breaking or running out of wire during a high speed winding operation. When this occurs, the end of the wire on the bobbin may be rotated at a relatively high speed, breaking off into several small pieces that are then thrown around the interior of the machine, occasionally landing on an adjacent winding device. FIG. 2 illustrates exemplary paths, represented by respective dashed lines 22 and 24, of wire debris in the event of a wire breaking incident in a bobbin $12_2$. It will be appreciated from FIG. 2 that the shielding arrangement collectively provided by respective shields 20 is unable to prevent the undesirable introduction of debris into adjacent winding assemblies $30_1$ and $30_2$. If these pieces are wound into, under, or statically adhere to the outside of the devices being wound, such as bobbins $12_1$ and $12_3$, these devices may prematurely fail in the field and be returned as warranty failures. Because of the large number of devices that may be deployed in the field, suppliers of automotive components, such as the assignee of the present invention, are particularly interested in being able to reduce or eliminate the foregoing issues without introducing burdensome costs and complicated equipment to the winding operations.

Various devices have been proposed with the intention of helping contain or prevent the introduction of debris into the wound device. Examples of such devices include protective shields that may partially surround the device being wound. The shields, as shown in FIGS. 1 and 2, generally provide a closed bottom and include openings or slits in the top to allow the wire to enter from above. Other proposed devices may include automated counters that, in theory, should prevent the wire from running out, and thus avoid the possibility of having to scrap all of the wound devices that may be simultaneously processed by any given machine, in the event of a wire break/run-out.

Unfortunately, these proposed devices are limited in their effectiveness due to their inability to properly account for the relevant physical principles applicable to the winding operation and/or cost restrictions. For example, having to scrap all parts would incrementally add cost to the winding operation since it would result in the disposal of good parts. In practice, the automated counters may not consistently prevent the occasional wire break that may occur during the winding operation. In practice, as discussed in the context of FIG. 2, the protective shields can allow stray wire and other contaminants to be pulled by gravity into the part. If a stray wire or contaminant gets "inside" one of these shields with a closed bottom, the shield unfortunately acts as a storage device and would hold the fine wire debris or contaminant undesirably close to the wound component. Elimination of the potential contaminant would require visual detection of the fine debris and burdensome manual removal, otherwise the debris may be eventually picked up due to whirling air currents that may develop inside the shield, as the receiving spool rotates and the debris could be eventually wound into the device.

In view of the foregoing considerations, it is desirable to provide low-cost and reliable winding machine and method that provides improved shielding relative to debris that may develop during a winding operation to avoid or substantially reduce the introduction of that debris into devices that, for example, may be wound simultaneously.

BRIEF SUMMARY OF THE INVENTION

Generally, the present invention fulfills the foregoing needs by providing in one aspect thereof, a winding machine comprising a plurality of winding assemblies adjacent to one another. Each assembly comprises a respective device for feeding a strand of wire to the assembly, and a bobbin for receiving the strand of wire, wherein the device for feeding the strand of wire is positioned to feed the wire into the assembly through the bottom thereof. A respective shield for each winding assembly is provided. The shield includes a window at the bottom thereof for allowing passage to the strand of wire. The shield comprises lateral and top sections configured to partially enclose the assembly, wherein the lateral section extends sufficiently beneath the receiving spool so that-any debris therein egresses from the assembly through the window and is prevented from being propelled into any adjacent assemblies, thus reducing the occurrence of debris-induced faults.

In another aspect thereof, the present invention further fulfills the foregoing needs by providing a method for shielding a winding machine relative to debris during a winding operation. The method allows providing at least one winding assembly. The method further allows feeding a respective strand of wire to the winding assembly, wherein the strand of wire is fed into the assembly through the bottom thereof. A shield is provided for the winding assembly. The shield is configured to include a window at the bottom thereof for allowing passage to the strand of wire. The shield further includes lateral and top sections configured to partially enclose the assembly, wherein the lateral section extends sufficiently beneath the assembly so that any debris therein egresses from the assembly through the window and is prevented from being propelled into any adjacent assemblies, thus reducing the occurrence of debris-induced faults.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

The inventors of the present invention have innovatively recognized winding machine and techniques that allow for improved shielding relative to debris, such as may be produced during a winding operation. More particularly, the inventors of the present invention have recognized that substantial reduction or avoidance of contamination on a workpiece being wound, such as the windings used in ignition coils or any coil for relatively high voltage applications, is achieved when the strand of wire drawn onto the component being wound is provided through the bottom of a winding assembly, i.e., below the component being wound.

Figure 1A:
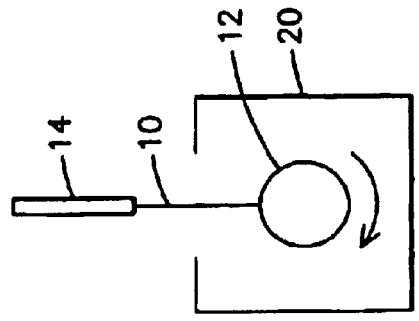
FIG. 1, collectively made up of FIGS. 1A and 1B, illustrates one known shielding in a winding machine.
Figure 1B:
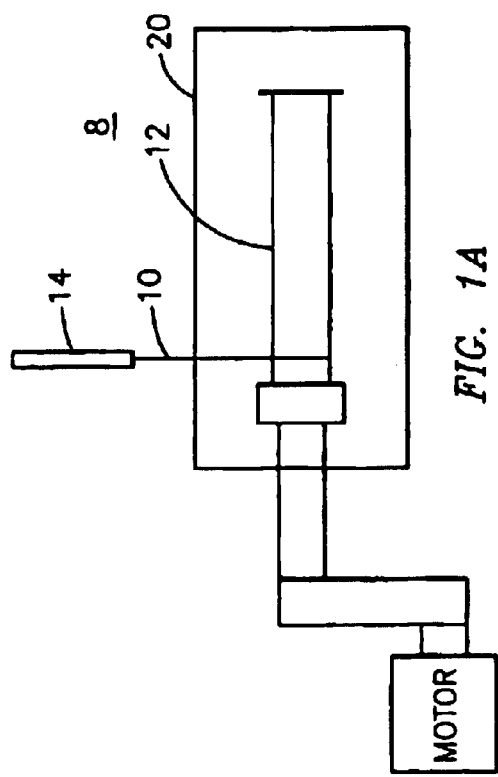
Figure 2:
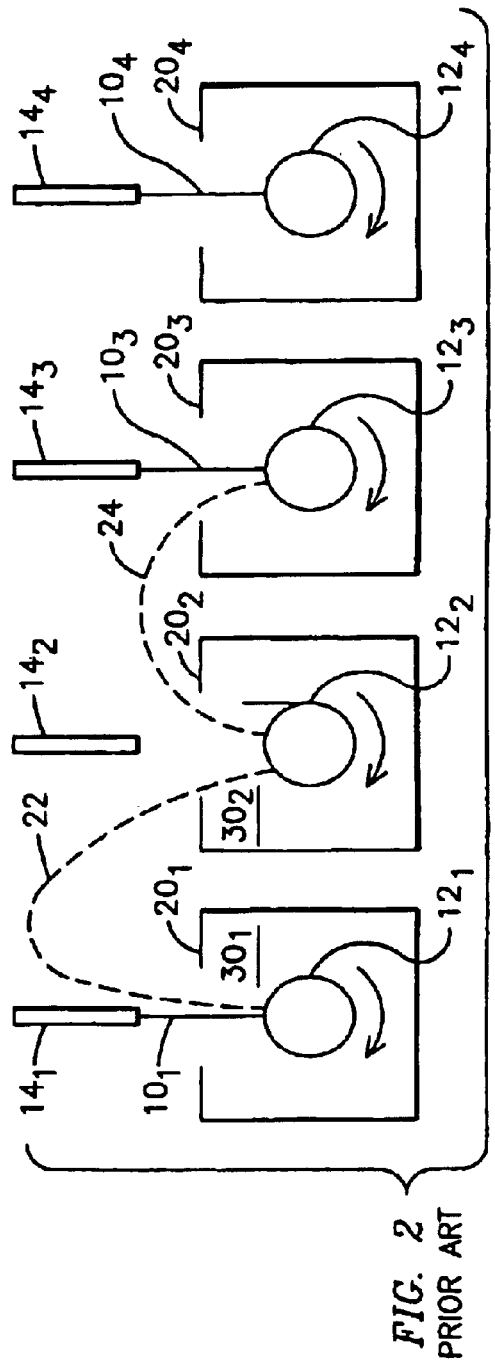
FIG. 2 illustrates some of the problems associated with the winding machine of FIG. 1.
Figure 3:
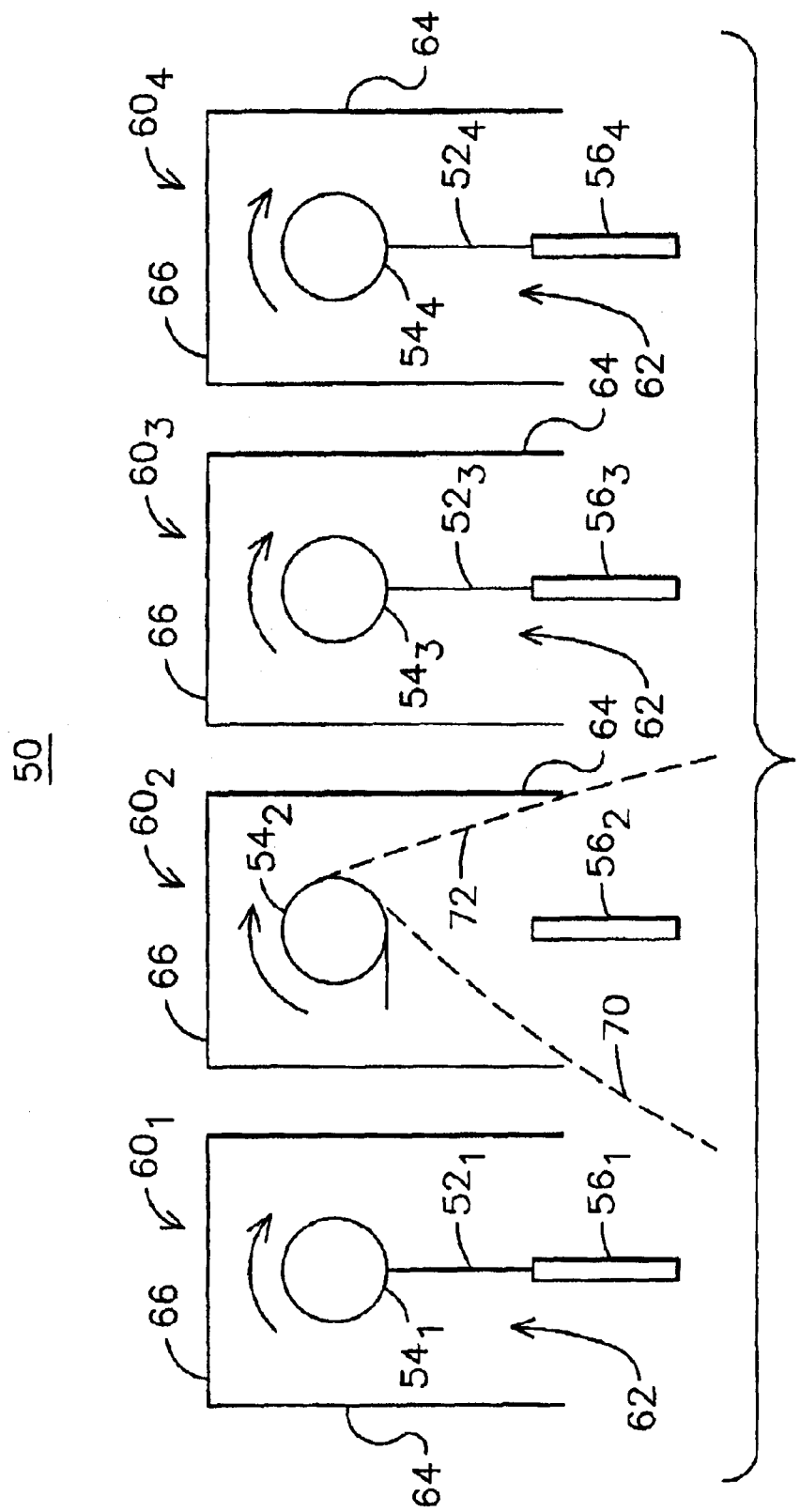
FIG. 3 illustrates a schematic representation of a winding machine embodying aspects of the present invention that allows for improved shielding relative to debris, such as may be produced during a winding operation.

As illustrated in FIG. 3, a winding machine 50 embodying aspects of the present invention may be made up of a plurality of winding assemblies, such as winding assemblies $60_1$ through $60_4$ adjacent to one another. Each assembly includes a respective device 56 for feeding a strand of wire 52 to the assembly, and a bobbin 54 for receiving the strand of wire. In one exemplary embodiment, device 56 may comprise a wire tensioner and a wire guide. As seen in FIG. 3, the device 56 for feeding the strand of wire is positioned to feed the wire into the assembly through the bottom of the assembly and the strand of wire is fed generally vertical relative to the receiving bobbin.

A respective shield 60 is provided for each winding assembly. The shield includes a window 62 at the bottom thereof for allowing passage of the strand of wire. The shield may comprise lateral and top sections 64 and 66, respectively, or any shape configured to surround the top and sides of the assembly so as to partially enclose the assembly. As illustrated in FIG. 3, the lateral section 64 extends sufficiently beneath the receiving bobbin 54 so that any debris therein egresses from the assembly through the window and is prevented from being propelled into any adjacent assemblies, thus avoiding the occurrence of debris-induced faults. Dashed lines 70 and 72 represent exemplary trajectories of wire debris in the event of a wiring breaking incident in winding assembly $60_2$. It will be appreciated that, in lieu of allowing contamination of adjacent winding assemblies, such as assemblies $60_1$ and $60_3$, the shielding arrangement advantageously allows the wiring debris to fall through the window.

In one exemplary embodiment, the cross-section of the shield essentially provides an inverted U-shaped shield positioned over the winding assembly to prevent any wire debris or any other foreign object from being propelled from one winding assembly to the next. The sides of the U shield would be configured to provide line of sight blockage to the debris therein would not allow the debris to be thrown to the adjacent spindles. As will be readily appreciated by those skilled in the art, in conjunction with standard cleaning and wire routing devices (e.g., felt pads), a shielding improvement embodying aspects of the present invention would not allow the wire pieces to re-enter the winding area.

In another advantageous aspect of the present invention, the foregoing implementation can be quickly and economically retrofitted into presently available winding machines without affecting the quality or abilities of present winding operations.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A winding machine comprising:
   a plurality of winding assemblies adjacent to one another, each assembly comprising a respective device for feeding a strand of wire to the assembly, and a bobbin for receiving the strand of wire, wherein the device for feeding the strand of wire is positioned to feed the wire into the assembly from below the assembly; and
   a respective shield for each winding assembly, the shield including a window at a bottom thereof for allowing passage to the strand of wire, the shield comprising lateral and top sections configured to partially enclose the assembly, wherein the lateral section extends sufficiently beneath the receiving bobbin so that any debris therein egresses from the assembly through the window and is prevented from being propelled into any adjacent assemblies, thus reducing the occurrence of debris-induced faults.

2. The winding machine of claim 1 wherein the device for feeding the strand of wire comprises a tensioner and a directing device.

3. The winding machine of claim 1 wherein the thickness of the strand of wire corresponds to a gage of about 40 American Wire Gage (AWG) and smaller diameter.

4. The winding machine of claim 1 wherein the strand of wire is fed generally vertical relative to the receiving bobbin.

5. The winding machine of claim 1 wherein the receiving bobbin comprises a winding for a coil.

6. A winding machine comprising:
   at least one winding assembly;
   a device for feeding a respective strand of wire to the at least one winding assembly, wherein the strand of wire is fed into the at least one winding assembly from below the assembly; and
   a shield for the at least one winding assembly, the shield including lateral and top sections that define a window at a bottom thereof so that any debris therein egresses from the at least one winding assembly through the window and is prevented from being propelled into any adjacent winding assemblies, thus reducing the occurrence of debris-induced faults.

7. The winding machine of claim 6 wherein the device for feeding the strand of wire comprises a tensioner and a directing device.

8. The winding machine of claim 6 wherein the thickness of the strand of wire corresponds to a gage of about 40 American Wire Gage (AWG) and smaller diameter.

9. The winding machine of claim 6 wherein the strand of wire is fed generally vertical relative to a receiving bobbin.

10. A method for shielding a winding machine relative to debris during a winding operation, the method comprising:
    providing at least one winding assembly;
    feeding a respective strand of wire to the at least one winding assembly, wherein the strand of wire is fed into the at least one winding assembly from below the assembly; and providing a shield for the at least one winding assembly; and configuring the shield to include a window at a bottom thereof for allowing passage to the strand of wire, the shield further including lateral and top sections configured to partially enclose the at least one winding assembly, wherein the lateral section extends sufficiently beneath the at least one winding assembly so that any debris therein egresses from the at least one winding assembly through the window and is prevented from being propelled into any adjacent winding assemblies, thus reducing the occurrence of debris-induced faults.

11. The method of claim 10 wherein the thickness of the strand of wire corresponds to a gage of about 40 American Wire Gage (AWO) and smaller diameter.

12. The method of claim 10 wherein the strand of wire is fed generally vertical relative to a receiving bobbin.

* * * * *